United States Patent [19]
Hufford et al.
[11] 4,090,797
[45] May 23, 1978

[54] MECHANICAL COUPLING

[75] Inventors: James N. Hufford; Wayne A. Barden, both of Elkhart, Ind.
[73] Assignee: CTS Corporation, Elkhart, Ind.

[21] Appl. No.: 723,889
[22] Filed: Sep. 16, 1976

Related U.S. Application Data

[62] Division of Ser. No. 516,749, Oct. 21, 1974, Pat. No. 3,996,549.

[51] Int. Cl.$^2$ .............................................. F16C 11/06
[52] U.S. Cl. .................................... 403/157; 403/119; 403/364
[58] Field of Search ............... 403/364, 331, 354, 157, 403/119, 116, 117, 291

[56] References Cited

U.S. PATENT DOCUMENTS

| | | | |
|---|---|---|---|
| 1,173,704 | 2/1916 | Blanchard | 403/354 |
| 2,805,084 | 9/1957 | Hall | 59/85 X |
| 3,243,165 | 3/1966 | Woody et al. | 403/315 X |
| 3,996,549 | 12/1976 | Hufford et al. | 403/58 X |

FOREIGN PATENT DOCUMENTS

| | | | |
|---|---|---|---|
| 658,732 | 4/1938 | Germany | 403/119 |
| 683,480 | 11/1939 | Germany | 403/119 |

*Primary Examiner*—Wayne L. Shedd
*Attorney, Agent, or Firm*—John J. Gaydos

[57] ABSTRACT

A mechanical coupling device is provided with a pair of oppositely disposed arcuate jaws and integral arms defining a slot communicating with a cavity for connecting a shaft thereto. A tongue integral with the shaft is engaged by the jaws and suspended within the cavity, and the coupling device slides axially and laterally along the tongue and pivots along the arcuate jaws to eliminate end and side thrust of the shaft. A variable resistance control connected to the coupling device comprises a substrate closing one end of a housing and a rotatable driver disposed within the housing. A resistive path and a conductive collector path are disposed on the substrate along the same radius and a contactor comprising a pair of diametrically opposed contact fingers symmetrically disposed near the periphery of the driver engages the resistive and collector paths.

8 Claims, 6 Drawing Figures

MECHANICAL COUPLING

This is a division of application Ser. No. 516,749 filed Oct. 21, 1974 issuing as U.S. Pat. No. 3,996,549.

The present invention relates to an electrical control and more particularly to an electrical control with a mechanical coupling therefor.

Many electrical control and monitoring applications are required in the severe environment of under-the-hood automotive conditions. A typical application would be connecting a variable resistor to the shaft of a butterfly valve in a carburetion system. Such conditions require a rigid mechanical assembly, resistance to petroleum base vapors and to extreme ambient temperature variations, as well as a long life control in the order of 1½ million cycles of operation. On existing controls, one of the common modes of failure during extreme rotational life testing in such conditions is the shaft of the control binding in the bushing of the control. This binding or side thrust is often due to the misalignment of the two shafts connected by the mechanical coupling device. Axial misalignment of the two shafts can also cause axial end thrust of one of the shafts causing excessive wear and damage to one of the controls particularly to an electrical control. Prior art coupling devices are generally relatively complex and expensive or do not eliminate axial end thrust as well as side thrust on connected shafts without additional fastening steps to secure the shafts to the coupling device. It would therefore be desirable to provide a simple and economical mechanical coupling for a pair of shafts which eliminates both the side and end thrust on the shafts due to shaft misalignment.

Extreme life testing on existing variable resistance controls in under-the-hood automotive conditions has also indicated failure of the control because of the excessive wear of the portion of the contactor engaging the collector. The excessive wear of the contactor at this point is due primarily to the difficulty in optimizing the pressure of the contactor on the collector because of the limited radial extension of the contactor at this point. Since the resistive path is generally near the periphery of the control, there is usually a much longer radial extension of the contactor at the point of engagement with the resistive path and therefore proper contact pressure of the contactor with the resistive path is much more easily obtained. It would therefore be desirable to eliminate the excessive wear of the contactor at the point of engagement with the collector by disposing the collector path at substantially the same radius as the resistive path and providing an elongated contact finger engaging the collector path.

Accordingly, it is an object of the present invention to provide a new and improved mechanical coupling for an electrical control.

Still another object of the present invention is to provide a mechanical coupling device for connecting a pair of shafts wherein the coupling device is provided with the means to slide laterally and axially with respect to the shafts and pivot with respect to the shafts to eliminate shaft side and end thrust.

Another object of the present invention is to provide a new and improved coupling device having an end provided with a slot communicating with a cylindrical cavity for receiving a tongue integral with a shaft.

A further object of the present invention is to provide a new and improved coupling device comprising a pair of oppositely disposed arcuate jaws having arms connected thereto defining a cavity wherein a shaft is engaged by the jaws and suspended in the cavity.

Further objects and advantages of the present invention will become apparent as the following description proceeds and the features of novelty characterizing the invention will be pointed out with particularity in the claims annexed to and forming a part of this specification.

Briefly, the present invention is concerned with a mechanical coupling device having end portions comprising similar coupling members for interconnecting a pair of shafts. One of the coupling members comprises a pair of oppositely disposed arcuate jaws connected to arms, the jaws and arms defining a slot communicating with a cylindrical cavity. A tongue integral with one of the shafts extends from a shoulder and is engaged by the jaws with the end of the tongue being suspended within the cavity. The end of the coupling device is spaced apart from the shoulder and the coupling device is free to slide axially along the tongue of the shaft. The coupling device is also free to slide and pivot laterally along the tongue integral with the shaft as well as to pivot about the arcuate jaws. In one embodiment, the coupling device is connected to the shaft of a variable resistance control, the shaft being integral with a driver disposed inside a housing. A ceramic substrate closes one end of the housing and a resistance path and a conductive collector path are diametrically disposed along the same radius on a surface of the substrate. A contactor is constrained to rotate with the driver and comprises a base section secured near the periphery of the driver, a U-shaped center section integral with the base section extending to the center of the driver, and a pair of elongated resilient contact fingers extending from opposite sides of the base section along the periphery of the driver. One of the contact fingers engages the resistance path on the substrate and the other of the contact fingers engages the conductive collector path.

For a better understanding of the present invention, reference may be had to the accompanying drawings, wherein the same reference numerals have been applied to like parts and wherein.

Figure 1:
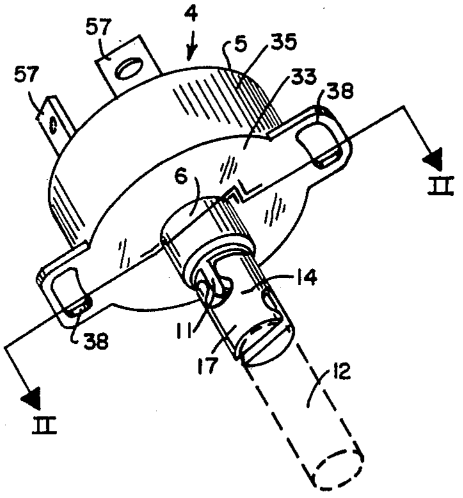
FIG. 1 is an isometric view of a mechanical coupling device and a variable resistance control made in accord with the present invention.

Referring now to the drawings, there is illustrated a variable resistance control generally indicated at 4 comprising a zinc die cast housing 5 with integral bushing 6, and a thermoplastic shaft 7 comprising a cylindrical portion 9 and integral tongue or double flat portion 11 extending beyond the bushing 6, a shaft 12 shown in phantom for connection to a not shown external device, and a mechanical coupling device 14 interconnecting the shaft 12 with the shaft 7. It should be understood that although a variable resistance control is shown at 4, the coupling device 14 can be used to interconnect various other electrical and mechanical controls.

Figure 2:
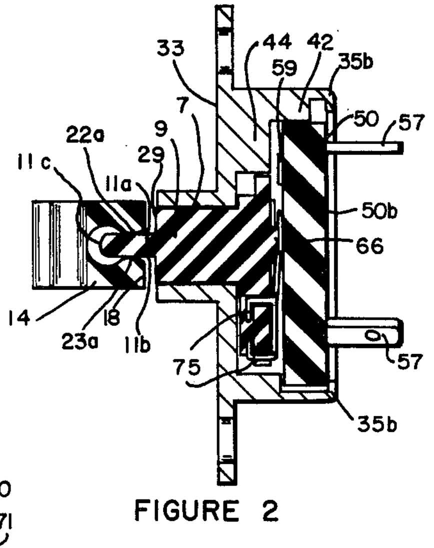
FIG. 2 is a sectional view taken along lines II—II of the mechanical coupling device and variable resistance control shown in FIG. 1.
Figure 3:
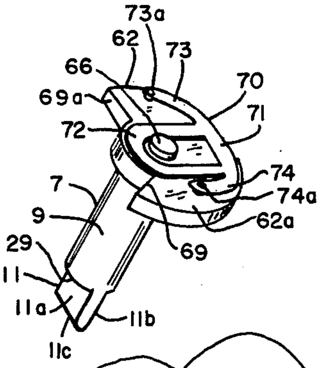
FIG. 3 is an exploded view of the mechanical coupling device and variable resistance control shown in FIG. 1.
Figure 6:
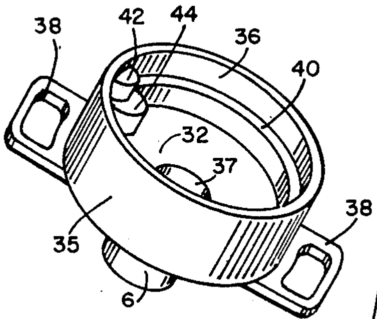
FIG. 6 is a top plan view of the driver and contactor of the variable resistance control shown in FIG. 1.
Figure 6:
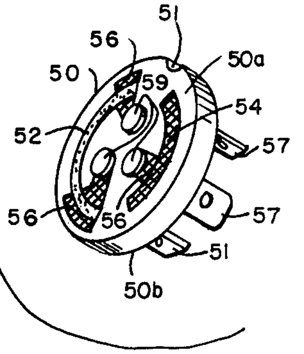
Figure 6:
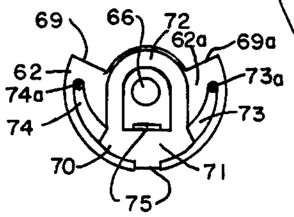
Figure 5:
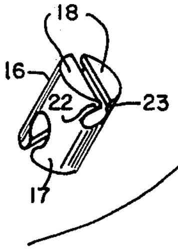
FIGS. 4 and 5 are front and side views of the mechanical coupling device illustrating pivoting of the coupling device with respect to a connected shaft.
Figure 5:
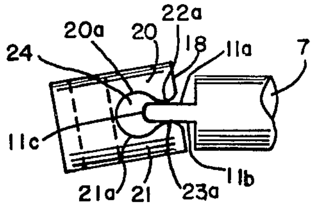
Figure 4:
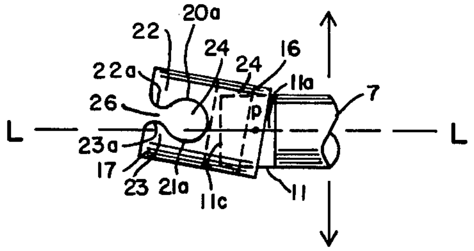

Considering first the mechanical coupling device 14, in accord with the present invention, the coupling device 14 provides a pair of similar coupling members 16 and 17 disposed at alternate ends. With reference to FIGS. 3, 4 and 5, coupling member 16 comprises an end surface 18, a pair of opposed arms 20 and 21, and arcuate jaws or pivot members 22 and 23 integral with respective arms 20 and 21. The arms 20 and 21 are provided with arcuate surfaces **20*a* and 21*a* defining a cylindrical cavity 24 and the jaws 22 and 23 are provided with curved surfaces 22*a* and 23*a* generally defining a hyperbolic shape illustrated by the slot 26. The surfaces 20*a*–23*a*, cylindrical cavity 24 and slot 26 are also illustrated in FIG. 4 with respect to coupling member 17. It should be understood that the surfaces 20*a*–23*a* are similar in both coupling members 16 and 17 and that the difference between coupling member 16 and coupling member 17 is the perpendicular relationship of the cylindrical cavity and slot in coupling member 16 with the cylindrical cavity and slot in coupling member 17. As shown in phantom in FIG. 1, a flat portion preferably a double flat portion of shaft 12 extends into the cylindrical cavity and slot in coupling member 17 to interconnect the shaft 12 with the coupling device 14. As seen in FIGS. 2, 3 and 5, the tongue 11 of shaft 7 and the cylindrical portion 9 form a shoulder 29 and the tongue 11 is provided with side surfaces 11*a* and 11*b* and end portion 11*c*. Curved surfaces 22*a* and 23*a* of jaws 22 and 23 engage surfaces 11*a* and 11*b* respectively of the tongue 11 to interconnect the coupling device 14 with shaft 7 of variable resistance control 4. Preferably, there is an interference fit between the tongue 11 and the slot 26 to provide for simultaneous rotation of the shaft and coupling device without the need for additional fastening means and to prevent backlash or the rotational movement of either the tongue 11 or the coupling device 14** without the movement of the other.

Preferably, the end portion **11*c* of the tongue 11 is spaced from the arcuate surfaces 20*a* and 21*a* and the end surface 18 is spaced from the shoulder 29 thereby providing freedom of axial movement of the coupling device 14 in the axial direction along the tongue 11. Any axial misalignment of the shaft 12 with respect to the shaft 7 of the variable resistance control 4 is compensated for by the axial movement of the coupling device 14 along the surfaces 11*a* and 11*b* of the tongue 11 and, in particular, misalignment in the axial direction toward the shoulder 29 will not exert an undesirable axial end thrust upon the shoulder 29 causing internal damage to the variable resistance control 4**.

In accord with the present invention, the mechanical coupling device 14 also eliminates side thrust or those forces on the shaft 7 causing binding of the cylindrical portion 9 against bushing 6 caused by the misalignment of the shaft 12 with shaft 7. As seen in FIG. 4, the coupling device 14 is free to slide laterally in the direction of the arrows along surfaces **11*a* and 11*b* of tongue 11 to compensate for misalignment. The coupling device 14 is also free to tilt laterally with respect to an imaginary line LL along the axis of shaft 7. As seen in FIG. 4, the coupling device 14 is tilted upwardly with respect to the dotted line through shaft 7, the pivoting of the coupling device 14 being provided by the rotation of the coupling device 14 about an imaginary point P of engagement of the curved surfaces 22*a* and 23*a* with surfaces 11*a* and 11*b* of tongue 11. As viewed in FIG. 5, for the same pivoting motion the coupling device 14 would tilt either outwardly from the paper or inwardly into the paper with respect to shaft 7**.

FIG. 5 illustrates a 90° rotation of the engagement of shaft 7 with coupling device 14 from the engagement as shown in FIG. 4. As seen in FIG. 2, with curved surfaces **22*a* and 23*a* engaging surfaces 11*a* and 11*b*, the coupling device 14 is free to roll or pivot around curved surfaces 22*a* and 23*a* with respect to tongue 11 of shaft 7. FIG. 5 illustrates the coupling device 14 tilted with respect to shaft 7, the surface 11*a* pivoted around curved surface 22*a* and the surface 11*b* pivoted around curved surface 23*a*. Preferably, the pivotal motion of the jaws 22 and 23 about tongue 11 increases the tension between the jaws 22 and 23 and the tongue 11 as a further prevention against backlash during rotation of shaft 7 and coupling device 14. The cylindrical cavity 24 allows the pivotal motion of end portion 11*c* of tongue 11 free from contact with arcuate surfaces 20*a* and 21*a*. The coupling device 14 provides a universal coupling means eliminating end thrust as well as side thrust in any direction due to the misalignment of the shaft 12 with the shaft 7. It should be noted that preferably the curved surfaces 22*a* and 23*a* form continuous curved surfaces and that the coupling device 14 is of thermoplastic or other suitable material. Therefore, if the surfaces 22*a* and 23*a* have flat sections due to manufacturing tolerances, the arms 20 and 21 flex outwardly from one another. This outward flexing increases the size of the slot 26 allowing for the pivotal motion of the coupling device 14 about such flat section. Also, the resiliency of the jaws 22 and 23 and arms 20 and 21 engaging tongue 11 compensates for wear to maintain a tight engagement between tongue 11 and jaws 22 and 23**.

With reference to the variable resistance control 4, the housing 5 is provided with a front wall 32, a back wall 33, and a depending rim 35 with internal wall 36. Bushing 6 is provided with an aperture 37 and extends from the back wall 33 and a pair of mounting brackets 38 extend radially outwardly from the rim 35. It should be understood that other versions of the housing 5 could be provided, such as, with a threaded bushing or without mounting brackets 38. A ridge 40 is disposed integral with the internal wall 36 of the rim 35 and a locator 42 extends from the ridge 40 integral with the internal wall 36. A stop 44 integral with front wall 32 extends from front wall 32 to locator 42. A ceramic substrate 50 of alumina or any other suitable material provided with a notch 51 and a surface **50*a* supports a resistive path 52, a conductive collector path 54 and conductive pads 56 connected to the resistive path 52 and collector path 54. Preferably, the conductive pads 56 and collector path 54 comprise a quantum of low resistance material and the resistive path is formed from a cermet resistive material. Terminals 57 are secured to the underside 50*b* of the ceramic substrate 50 by rivots 59 and are electrically connected to the conductive pads 56 for connecting the variable resistance control to an external circuit. The periphery of the surface 50*a* of substrate 50 abuts the ridge 40 of the housing 5 and the locator 42 of the housing interfits in notch 51 to locate the substrate 50 within the housing 5. An edge portion 35*b* is rolled over the underside 50*b* of the substrate 50 to secure the substrate to the housing. Rotatably disposed within the housing 5 is a driver 62 provided with a surface 62*a* and a pair of stop members 69 and 69*a* and integral with the driver 62 is cylindrical portion 9 of shaft 7 extending into aperture 37 of bushing 6**.

In accord with the present invention, a contactor 70 is constrained to rotate with the driver 62 and comprises a base section 71, U-shaped portion 72 and a pair of elongated resilient contact fingers 73 and 74 extending symmetrically outwardly from either side of the base section 71. A center stand-off 66 located on surface 62a of driver 62 prevents over-compression of the contact fingers 73 and 74 upon application of inward end thrust to shaft 7. Each of the contact fingers 73 and 74 is provided with a carbon contact button 73a and 74a. A pair of ears 75 integral with the base section 71 interfit slots in the driver 62 to secure the base section 71 to the driver 62 near the periphery of surface 62a. The legs of the U-shaped portion 72 are integral with the base section 72, the U-shaped portion 72 extending along surface 62a and enclosing the stand-off 66. Contact finger 73 biases contact button 73a into engagement with collector path 54 and contact finger 74 biases contact button 74a into engagement with resistive path 52. The pressure of the contact fingers 73 and 74 on the substrate 50 and the extreme environmental conditions often cause warping and deformation of the driver 62 during operation of the control. The U-shaped portion 72 spreads the contact finger pressure over a greater area of the driver to eliminate deformation.

In accord with the present invention, the collector path 54 is disposed near the periphery of the substrate 50 along the same radius from the center of the substrate 50 as the resistive path 52. Preferably, the contact fingers 73 and 74 are diametrically opposed near the periphery of the driver 62 along the same radius from the center of the driver 62. By providing an elongated resilient contact finger 73 engaging the collector path 54, a more suitable contact pressure on the collector path is obtained considerably reducing the wear of the collector path 54 and engaged contact button 73a. Upon rotation of the driver 62, the contact button 73a wipingly engages collector path 54 and contact button 74a wipingly engages resistive path 52, the resilient contact fingers 73 and 74 providing a uniform spring tension on the resistive path 52 and collector path 54. Rotation of the driver in a first direction moves stop member 69 in an interference path with stop 44 and rotation of the driver in the opposite direction moves stop member 69a in an interference path with stop 44 to arrest rotation of driver 62.

While there has been illustrated and described what is at present considered to be a preferred embodiment of the present invention, it will be appreciated that numerous changes and modifications are likely to occur to those skilled in the art and it is intended in the appended claims to cover all those changes and modifications which fall within the true spirit and scope of the present invention.

What is claimed as new and desired to be secured by Letters Patent of the United States is:

1. The combination of a first shaft connected to an electrical control, a second shaft connected to a second control, said first shaft being provided with a shoulder, a tongue integral with said first shaft and extending from the shoulder, and a coupling device interconnecting said first and second shafts, said coupling device comprising a first arcuate jaw, a second arcuate jaw disposed opposite said first arcuate jaw, said first and second jaws defining a slot, said jaws engaging said tongue, an arm connected to each of said jaws, said arms defining a cylindrical cavity communicating with said slot, said arms being supported by and said slot communicating with one end of the coupling device, the tongue having planar and substantially parallel sides and a thickness substantially equal to the spacing between the jaws, one end of said tongue being suspended within said cavity, the cavity being larger than the tongue, said shoulder and said one end of the coupling device being spaced apart whereby said coupling device is capable of axial and lateral movement along said tongue and said jaws provide for pivotal motion of said tongue about said jaws.

2. A coupling device connected to a shaft of a first control comprising a first pivot means, a second pivot means disposed opposite said first pivot means, an arm connected to each of said pivot means, said arms defining a cavity, a tongue extending from the shaft and having planar and substantially parallel sides and a thickness substantially equal to the spacing between the first and the second pivot means, said tongue being engaged by said first and second pivot means and extending into said cavity for pivotal motion of said coupling device with respect to said shaft, the cavity being larger than the tongue whereby the first and second pivot means is movable axially and laterally along the tongue and the pivot means provide pivotal motion of the tongue about said means.

3. The coupling device of claim 2, wherein each of said pivot means comprises an arcuate portion, said tongue being disposed between and abutting said arcuate portions.

4. The coupling device of claim 3, wherein said shaft is provided with a double flat portion and said arcuate portions define a slot, said double flat portion being disposed in said slot.

5. The coupling device of claim 2, wherein said shaft comprises a shoulder and an elongated portion extending from said shoulder, said shoulder being spaced apart from said coupling device, said elongated portion being disposed in said cavity, the end of said elongated portion being spaced apart from the walls of said cavity providing for relative axial movement of the elongated portion and the coupling device before engagement of the shoulder with the coupling device or engagement of the end of the elongated portion with a wall of said cavity.

6. The coupling device of claim 2, wherein said shaft comprises an integral tongue and said pivot means comprise arcuate jaws, said jaws engaging said integral tongue for pivotal motion of said jaws about said shaft.

7. The coupling device of claim 6, wherein said cavity is cylindrically shaped and said jaws have arcuate surfaces generally defining a hyperbolic shape communicating with said cylindrical cavity, said hyperbolic shape communicating with one end of said coupling device, one end of said tongue being suspended in said cavity.

8. The coupling device of claim 2, wherein each of said jaws flexibly engages said shaft.

* * * * *